United States Patent [19]

Darling et al.

[11] Patent Number: 4,933,192

[45] Date of Patent: Jun. 12, 1990

[54] HYDRATABLE POWDERS WHICH FORM WOW EMULSIONS

[75] Inventors: Donald F. Darling; Martin J. Izzard, Northants; Kevin J. Povey, Hornchurch, all of United Kingdom

[73] Assignee: Unilever Patent Holdings B.V., Rotterdam, Netherlands

[21] Appl. No.: 31,324

[22] Filed: Mar. 27, 1987

[30] Foreign Application Priority Data

Mar. 27, 1986 [GB] United Kingdom ............... 8607717

[51] Int. Cl.$^5$ .................. A23L 1/19; A23L 1/195; A23L 1/24
[52] U.S. Cl. .................. 426/98; 426/601; 426/602; 426/605; 426/613; 426/589
[58] Field of Search ............... 426/601, 602, 605, 613, 426/589, 98

[56] References Cited

U.S. PATENT DOCUMENTS

| | | | |
|---|---|---|---|
| 4,011,661 | 3/1977 | Sezaki et al. ............................ | 34/12 |
| 4,034,124 | 7/1977 | Van Dam ............................ | 426/605 |
| 4,046,926 | 9/1977 | Gardiner ............................ | 426/613 |
| 4,341,811 | 7/1982 | Rule ............................ | 426/613 |
| 4,473,594 | 9/1984 | Miller et al. ............................ | 426/613 |
| 4,626,443 | 12/1986 | Takahashi ............................ | 426/613 |
| 4,626,444 | 12/1986 | Takahashi ............................ | 426/613 |
| 4,650,690 | 3/1987 | Bams et al. ............................ | 426/613 |

FOREIGN PATENT DOCUMENTS

| | | |
|---|---|---|
| 0120967 | 10/1984 | European Pat. Off. . |
| 0141477 | 5/1985 | European Pat. Off. . |
| 0229938 | 7/1987 | European Pat. Off. . |
| 1113462 | 5/1968 | United Kingdom . |
| 1488522 | 12/1977 | United Kingdom . |

OTHER PUBLICATIONS

Chemical Abstracts, vol. 105, No. 25, Abstract No. 224937k, p. 649, Dec., 1986.

Florence et al., International Journal of Pharmaceutics, 11:277–308, (1982).

ACS Symposium Series 272, "Macro- and Microemulsions", Florence et al., Chapter 23, pp. 359–379.

*Primary Examiner*—Jeanette Hunter
*Attorney, Agent, or Firm*—Cushman, Darby & Cushman

[57] ABSTRACT

A hydratable powder capable of providing a duplex emulsion is of value in food products. The powder contains the components of the emulsion and may be prepared by spray drying, freeze drying or spray crystallization.

12 Claims, No Drawings

HYDRATABLE POWDERS WHICH FORM WOW EMULSIONS

FIELD OF THE INVENTION

This invention relates to powders which are capable of rehydration to form water/oil/water emulsions. These powders may form the sole component of a human food or animal feed product or may be prepared to form an additive to a food or feed composition which may be in powder or other form.

BACKGROUND TO THE INVENTION

Although water/oil/water emulsions have been available for some years they have not been applied generally to food and other product applications because they are liquids which are difficult to handle and usually have to be prepared by the final product manufacture. Thus they are difficult to manufacture and transport and use as a component supplied to a final product manufacture from a component supplier. Examples of fields in which such emulsions are usable are soups, coffee whiteners, custards and fat additives for sausage type products. The presence of any internal water phase in the fat emulsion allows a total product with a reduced fat content to be achieved because the fat globules provide a subjective appreciation of fat while not providing a completely fat content. Emulsions of the w/o/w type allow control of rheology and can act as delivery systems for component e.g. perfumes and flavours.

GENERAL DESCRIPTION OF THE INVENTION

The invention provides a hydratable powder composition preferably having a particle size in the range 20 to 80 microns capable of hydration to form a duplex emulsion, comprising
  (i) from about 10% to about 80% by weight of a fat or oil component, usually a fat having a melting point above 25° C. would be a suitable component; usually the fat/oil component will be present up to about 60%, and may be present up to about 40%,
  (ii) a component which stabilizes water/oil emulsion having an HLB of not more than about 6 within the powdered fat component in an amount of about 0.05% to about 10% by weight of the total product, preferably at least about 0.5% and preferably up to about 2%,
  (iii) an osmotic pressure component within the fat particles and associated with the internal emulsion component in an amount of about 0.05% preferably from about 0.1% to about 10% by weight of the total powder composition,
  (iv) an oil/water external emulsifier having an HLB of at least 8 and forming from 0.5 to 10% by weight of the total powder composition and present in the hydratable powder on the external surface of the oil/fat component particles,
  (v) a matrix structure agent on the external surface of the fat particles forming from about 5% to about 80% by weight of the total product and preferably not more than about 55%,
  (vi) not more than about 5% by weight of moisture in the hydratable powder and preferably not more than about 2%.

The water content is determined by drying overnight at 100° C.

The hydratable powders of the invention provide a w/o/w emulsion when dispersed in an aqueous base. The oil/fat component is selected to be dispersible in the intended aqueous base at the use temperature of the latter. The conversion of powder to emulsion will be complete only in exceptional cases when the materials used and processing conditions are exactly optimised. Normally a conversion below 100% must be expected.

It will be noted the components of this powder product are defined by reference to the function they perform. The invention extends to powders in which one material component performs more than one function. Thus the functions of external emulsifier and matrix structure agent can be provided by a sodium caseinate component.

The invention extends to the use of the hydratable powders in food products at a level of from about 1% to about 60%.

The product may be a hydratable powder product, for example a custard, instant soup or instant sauce in which products the levels will be typically from about 10% to about 40% by weight. In such instant products the hydratable powders provide a fat content and/or creaminess.

When incorporated in human food or animal feed products the concentration of osmotic pressure component is required to be functionally sufficient to draw water into the oil or fat component. The applicants are aware of UK 1488422 (Kyowa Hakko) in which is described a rehydratable powder containing a drug. The powder is rehydratable to provide an injectable emulsion; this may be a duplex emulsion.

The hydratable powders of the invention are also of use in drawing water from a product for example a meat product during cooking. Powder based on Hycoa 5 (a palm oil fraction used in bakery), Admul WOL, sodium chloride, sodium caseinate and maltodextrin is capable of reducing the water activity in a finely minced meat product on cooking. The powder can be added at a level of 20% by weight and is capable of reducing the water activity from 0.98 to 0.96.

Preferably the powder of the invention is in an agglomerated form in a range about 100 to 1,000 microns.

Components of the formulation:

The edible oil/fat forms a dispersed phase in the duplex i.e. water/oil/water emulsion, in which the internal water phase is dispersed in the oil/fat phase which is, in turn, dispersed in the external continuous aqueous phase.

Examples of the oil/fat are palm oil, ground nut oil, sunflower oil and animal fats e.g. tallow and lard.

The internal emulsifier is required to stabilise the water in oil emulsion and will have a hydrophilic-lyophilic balance (HLB) of not more than 6, preferably not more than 5. An example of these emulsifiers are the polyglycerol esters of fatty acids, optionally polymerised fatty acids. Another suitable emulsifier is polyglycerol polyricinoleic acid obtainable from PPF International Limited of Ashford, England under the trade name Admul WOL. Other examples are sorbitan monooleate and analagous esters, sucrose esters and lecithin dependent on the other components. The internal emulsifier is capable of stabilising the water/oil emulsion in the first emulsion stage and diffuses only slowly out at the second emulsion stage when the oil droplets are emulsified in the external aqueous phase.

The external oil/water emulsifier will have an HLB of at least 8 and examples are polyoxyethylene sorbitan esters, proteins, for example milk protein and blood protein, egg yolk, phospho-lipids, caseinates and ethoxylated monoglycerides for animal feed applications. This emulsifier stabilises the oil or fat particles during processing, e.g. spray drying, and later dispersion in the aqueous phase. Other materials usable as the external o/w emulsifier are hydrolysed lecithin, egg yolk treated with enzymes e.g. phospholipase A2, octenyl succinic acid treated starch, propylene glycol alginate and diacetyl tartaric acid esters of monoglcyerides (E472E).

The internal aqueous phase, and hence the hydratable powder of the invention, is required to include an osmotic pressure component which generates an osmotic gradient between the internal and external aqueous phases. This osmotic pressure component will be water soluble with a relatively low oil solubility. Examples of this component are salts, e.g. sodium chloride, sugars, for example glucose and sucrose, malto-dextrins, proteins, amino acids and peptides.

The powder of the invention will generally contain a matrix structure agent to support the powder components, examples of these matrix materials are malto-dextrins, sodium caseinate and gum arabic. These materials function as a carrier and dispersant for the oil/fat component.

The water/oil/water emulsion formed by rehydration of the powder will usually have a composition by weight in the range:

| Fat component | about | 5 | to | about 40% |
| --- | --- | --- | --- | --- |
| Internal emulsifier | about | 0.05 | to | about 10% usually 5% (on fat) |
| Internal aqueous phase | about | 5 | to | about 50% (on fat) |
| External aqueous phase | about | 20 | to | about 60% |
| Osmotic component | about | 5 | to | about 70% usually 25% aqueous solution |
| Matrix material | about | 5 | to | about 25% on external phase |

Emulsions of this composition can also be used in the preparation of the powder.

Methods of preparing the hydratable powder are:

(i) Freeze drying: The water/oil/water emulsion is poured into liquid nitrogen and the frozen bulk is then dried at room temperature under a vacuum of about $10^{-2}$ Torr. The resulting solid lump can then be broken up to give the rehydratable powder in any desired particle size. A more convenient route for freeze drying the emulsion is to freeze the latter in a flask spun in a freezing mixture, for example acetone/dryice. The emulsion freezes as a layer on the inner surface of the flask and the latter can then be connected to a suitable vacuum line for the drying stage.

(ii) Spray drying: The water/oil/water emulsion can be spray dried provided the emulsion properties are selected to provide the appropriate viscosity/water content balance. A suitable means of atomisation is a centrifugal atomiser with the inlet air temperature in the tower being between 100° C. and 190° C. or even up to 220° C. It is possible to obtain suitable powders by operating at the lower end of this range e.g. at 120° C.

(iii) Spray crystallisation: The rehydratable powder can be prepared directly from the components by spray crystallising the fat/oil component. The fat component is first melted if necessary and to this is added finely divided sodium chloride which acts as the osmotic pressure component. Conveniently the finely divided salt may be prepared by adding a cold saturated solution to ethanol at $-15°$ C. to provide a precipitated salt which is filtered and dried. This finely divided sodium chloride is added to the mixture of melted fat and internal emulsifier. The mixture is then prepared by continuous mixing in suitable shear producing apparatus, e.g. a Silverson device at a temperature above the melting point of the fat. The mixture is then sprayed using a suitable device into a liquid nitrogen to give a free flowing powder. This powder, while retained cold, is added to the structuring matrix and external emulsifying agent. The powder is then allowed to warm when it forms a hydratable product which provides a duplex emulsion on adding to water at a suitable temperature. The spray crystallised material is added to the matrix and external emulsifier while cold to ensure the fat crystals are retained separate during the coating.

Thus the product may be formed directly from a duplex emulsion, in which case it may be said the rehydratable powder contains a memory of the emulsion structure, or it may be formed directly from the components by suitable processing and mixing steps as described in process iii).

Specific description of the invention:

Examples of the hydratable powder will now be given to illustrate but not limit the invention.

EXAMPLE I

A fat/creamer powder for instant soups was prepared by first making a water in oil emulsion with the composition:-

| Palm oil 43 | 391 g |
| --- | --- |
| Admul WOL emulsifier | 19 g |
| Sodium chloride | 54 g |
| Water | 160 g |

The water containing sodium chloride was homogenised into the fat containing the emulsifier at 60° C. using a Silverson mixer.

The resulting water in oil emulsion was then dispersed at 60° C. into water (2 litres) containing sodium caseinate (91g) and maltodextrin (615 g) using the same mixer.

The resulting duplex emulsion was then spray dried in a spray tower having a centrifugal atomiser an at inlet temperature at 120° C. and an outlet temperature of 50° C. The powder obtained (1200g) was used as a component of an instant soup powder. It provided a w/o/w emulsion when dispersed in water at 5% level at 95° C.

EXAMPLE II

Example I was repeated substituting the sodium chloride with sucrose (54g). A satisfactory hydratable powder was obtained.

EXAMPLE III

Example II was repeated with the level of w/o emulsifier being 6g in the first stage emulsification. A satisfactory hydratable powder was obtained.

EXAMPLE IV

Aqueous sucrose (30% w/w) solution (126g) was heated to 60° C. and mixed with 294g hardened palm kernel oil containing Admul WOL (5% w/w) at 60° C. in a Silverson mixer. The w/o emulsion was then mixed into 980 g of an aqueous phase at 60° C. using the Silverson mixer. The external aqueous phase had the composition by weight:

| | |
|---|---|
| Lactose | 5% |
| Sucrose | 25% |
| Maltodextrin 17DE | 5% |
| Sodium caseinate | 1% |
| Sodium tripolyphosphate | 0.1% |
| Water | 63.9% |

The resulting w/o/w emulsion was then separated into two batches and each dried by freeze drying.

Batch 1 was sprayed into liquid nitrogen and then freeze dried while Batch 2 was cooled to 10° C., frozen in a dry ice/acetone bath and freeze dried. Batch 1 provided a free flowing powder and Batch 2 lumps which could be broken up in a pestle to give a usable product. Both batches of powder product formed duplex emulsions when rehydrated with water a 60° C. at a 5% addition level.

EXAMPLE V

Finely divided salt (50g) prepared as described previously was dispersed in hardened palm kernel oil (450g) at 70° C. containing Admul WOL (23g). The dispersion was sprayed in to liquid nitrogen and the collected powder (200g) allowed to warm to −20° C. This powder was then blended with a mixture of maltodextrin 17 DE (100g) and sodium caseinate (100g) at 20° C. The blended powder, which comprised oil particles coated with the maltodextin/caseinate powders, was then allowed to warm to room temperature to provide a free flowing particulate product. A duplex emulsion was formed when 5g was dispersed in water (95g) at 60° C.

EXAMPLE VI

The duplex emulsion obtained by mixing the components of Example I was dried in a spray tower having a centrifugal atomiser using an inlet air temperature of 175° C. and an outlet air temperature of 85° C. The powder was then agglomerated in a Strea 2 agglomerator to give a powder having particles in the range 100 to 1,000 microns.

This agglomerated powder was then used as a fat/creamer in the following formulations.

(i) An instant mushroom soup comprising soup base (16.1g) and powder (11.9g) was rehydrated with boiling water (190 mls).

The agglomerated powder had good dispersion characteristics and a smooth liquid product of good consistency was obtained with stirring.

(ii) An instant cheese sauce comprising:

| | |
|---|---|
| Starch | 12.5 g |
| Cheese powder | 4 g |
| Maltodextrin | 25 g |
| Agglomerated powder | 16 g | was rehydrated with boiling water (125g). The agglomerated powder dispersed well and a smooth liquid product of good consistency was obtained with stirring.

(iii) An instant custard comprising:

| | |
|---|---|
| Custard powder | 15 g |
| Sugar | 25 g |
| Agglomerated powder | 16 g | was rehydrated with boiling water (125g). The agglomerated powder dispersed well and a smooth liquid product of good consistency was obtained with stirring.

EXAMPLE VII

This example demonstrates the use of one material component to provide two functions in the hydratable powder. Sodium caseinate is used to provide the external emulsifier and matrix structuring.

The components of the water/oil emulsion:

| | |
|---|---|
| Sodium chloride | 15 g |
| Soyabean oil | 150 g |
| Water | 120 g |
| Admul WOL emulsifier | 19 g | were formed into an emulsion and then dispersed in a solution of sodium caseinate (120g) in water (600g) as described in Example I to form a viscous duplex emulsion. This emulsion was dried at 70° C. in an oven to give a powder which rehydrated in water at 90° C. at a level of 10% w/v to give a duplex emulsion.

We claim:

1. A powder composition capable of hydration to form a duplex water-in-oil-in-water emulsion, comprising
   (i) from about 10% to about 80% by weight of an edible fat or oil component,
   (ii) an internal emulsion component which stabilises a water/oil emulsion having an HLB of not more than about 6 within the powdered fat component in an amount of from about 0.05% to about 10% by weight of the total product,
   (iii) an osmotic pressure component within the fat particles and associated with the internal emulsion component in an amount of about 0.05 to about 10% by weight of the total powder composition,
   (iv) an oil/water external emulsifier having an HLB of at least 8 and forming from 0.5% to 10% by weight of the total powder composition and present in the hydratable powder on the external surface of the oil or fat component particles,
   (v) a matrix structure agent on the external surface of the fat particles forming from about 5% to about 80% by-weiqht of the total product and
   (vi) not more than about 5% by weight of moisture in the rehydratable powder.

2. A powder composition according to claim 1 containing up to about 60% by weight of the fat/oil component.

3. A powder composition according to claim 2 containing up to about 40% by weight of the fat/oil component.

4. A powder composition according to any preceding claim wherein the fat/oil component is a fat having a melting point above 25° C.

5. A powder composition according to any preceding claim wherein the water/oil emulsifier (ii) is present in an amount of at least about 0.5% by weight of the total product.

6. A powder composition according to any preceding claim wherein the water/oil emulsifier (ii) is present in an amount up to about 2% by weight of the total product.

7. A powder composition according to any preceding claim wherein the matrix structure agent forms up to about 55% of the total product.

8. A powder composition according to any preceding claim wherein the amount of moisture in the powder is not more than about 2%.

9. A food product containing, as an additive thereto from about 1% to about 60% hydratable powder composition capable of hydration to form a duplex water-in-oil-in water emulsion, comprising
   (i) from about 10% to about 80% by weight of an edible fat or oil component,
   (ii) an internal emulsion component which stabilises a water/oil emulsion having an HLB of not more than about 6 within the powdered fat component in an amount of from about 0.05% to about 10% by weight of the total product,
   (iii) an effective amount of an osmotic pressure component within the fat particles and associated with the internal emulsion component,
   (iv) an oil/water external emulsifier having an HLB of at least 8 and forming from 0.5% to 10% by weight of the total powder composition and present in the hydratable powder on the external surface of the oil or fat component particles,
   (v) a matrix structure agent on the external surface of the fat particles forming from about 5% to about 80% by-weight of the total product and
   (vi) not more than about 5% by weight of moisture in the rehydratable powder.

10. A food product according to claim 9 characterised in that it is in powder form.

11. A hydratable powder according to claim 1 including palm oil as the fat component; polyglycerol polyricinoleic acid as the internal emulsifier; sodium chloride as the osmotic pressure component; sodium caseinate as the external emulsifier and maltodextrin as the matrix structure agent.

12. A method of preparing the powder of claim 1 which comprises preparing a water-in-oil emulsion by homogenizing an aqueous solution of the osmotic pressure component in a fat component containing the internal emulsifier; thereafter dispersing the water-in-oil emulsion in water containing the external emulsifying agent and matrix structure agent and then spray drying.

* * * * *